(12) United States Patent
Facchi et al.

(10) Patent No.: US 7,524,574 B2
(45) Date of Patent: Apr. 28, 2009

(54) MEMBRANE ELECTROCHEMICAL GENERATOR

(75) Inventors: Daniele Facchi, Rovato (IT); Eduardo Trifoni, Naples (IT); Antonino Toro, Mialn (IT); Luca Merlo, Montorfano (IT); Matteo Lenardon, Lomazzo (IT); Paolo Binelli, Milan (IT)

(73) Assignee: Nuvera Fuel Cells Europe, S.r.l., Milan (IT)

( * ) Notice: Subject to any disclaimer, the term of this patent is extended or adjusted under 35 U.S.C. 154(b) by 529 days.

(21) Appl. No.: 10/512,395

(22) PCT Filed: Apr. 23, 2003
(Under 37 CFR 1.47)

(86) PCT No.: PCT/EP03/04207

§ 371 (c)(1),
(2), (4) Date: May 25, 2005

(87) PCT Pub. No.: WO03/092091

PCT Pub. Date: Nov. 6, 2003

(65) Prior Publication Data

US 2006/0251948 A1    Nov. 9, 2006

(30) Foreign Application Priority Data

Apr. 23, 2002    (IT) .......................... MI2002A0869

(51) Int. Cl.
H01M 2/14    (2006.01)
H01M 8/04    (2006.01)
H01M 8/10    (2006.01)
H01M 2/08    (2006.01)

(52) U.S. Cl. .............................. 429/38; 429/26; 429/32; 429/36

(58) Field of Classification Search ................... 429/32, 429/28, 26, 35, 36, 38
See application file for complete search history.

(56) References Cited

U.S. PATENT DOCUMENTS 4,292,379 A    9/1981    Kothmann
5,565,072 A    10/1996    Faita et al.

(Continued)

FOREIGN PATENT DOCUMENTS

DE    42 34 093 A1    4/1994

(Continued)

*Primary Examiner*—Patrick Ryan
*Assistant Examiner*—Thomas H. Parsons
(74) *Attorney, Agent, or Firm*—Finnegan, Henderson, Farabow, Garrett & Dunner, L.L.P.

(57) ABSTRACT

A membrane electrochemical generator comprises a multiplicity of reaction cells (101) mutually connected in series and assembled according to a filter-press type configuration. Each reaction cell is delimited by a pair of conductive bipolar plates (103), which comprises a multiplicity of first calibrated holes (113*a*) for the passage of the gaseous reactants and a multiplicity of second calibrated holes (113*b*) for the discharge of the reaction products and of the optional residual reactants. The cooling cells (102) comprises a rigid peripheral portion (102*a*), whereupon a gasket (117) is laid, defining and sealing on each face of such peripheral portion a zone of collection of the gaseous reactants (118*a*) and a zone of collection of the reaction products and of the residual reactants (118*b*). In a filter-press configuration, these two zones are respectively overlaid to the first calibrated holes to reach the active area of the reaction cells (101).

14 Claims, 5 Drawing Sheets

U.S. PATENT DOCUMENTS

| | | |
|---|---|---|
| 5,616,431 A | 4/1997 | Kusunoki et al. |
| 6,007,933 A | 12/1999 | Jones |
| 6,174,616 B1 | 1/2001 | Marvin et al. |

FOREIGN PATENT DOCUMENTS

| | | |
|---|---|---|
| DE | 196 02 315 A1 | 7/1997 |
| DE | 100 48 871 A1 | 3/2002 |
| DE | 101 07 789 | 8/2002 |
| EP | 0 591 800 A1 | 4/1994 |
| EP | 0 629 015 | 12/1994 |
| EP | 0 896 379 | 2/1999 |
| EP | 1 083 616 A2 | 3/2001 |

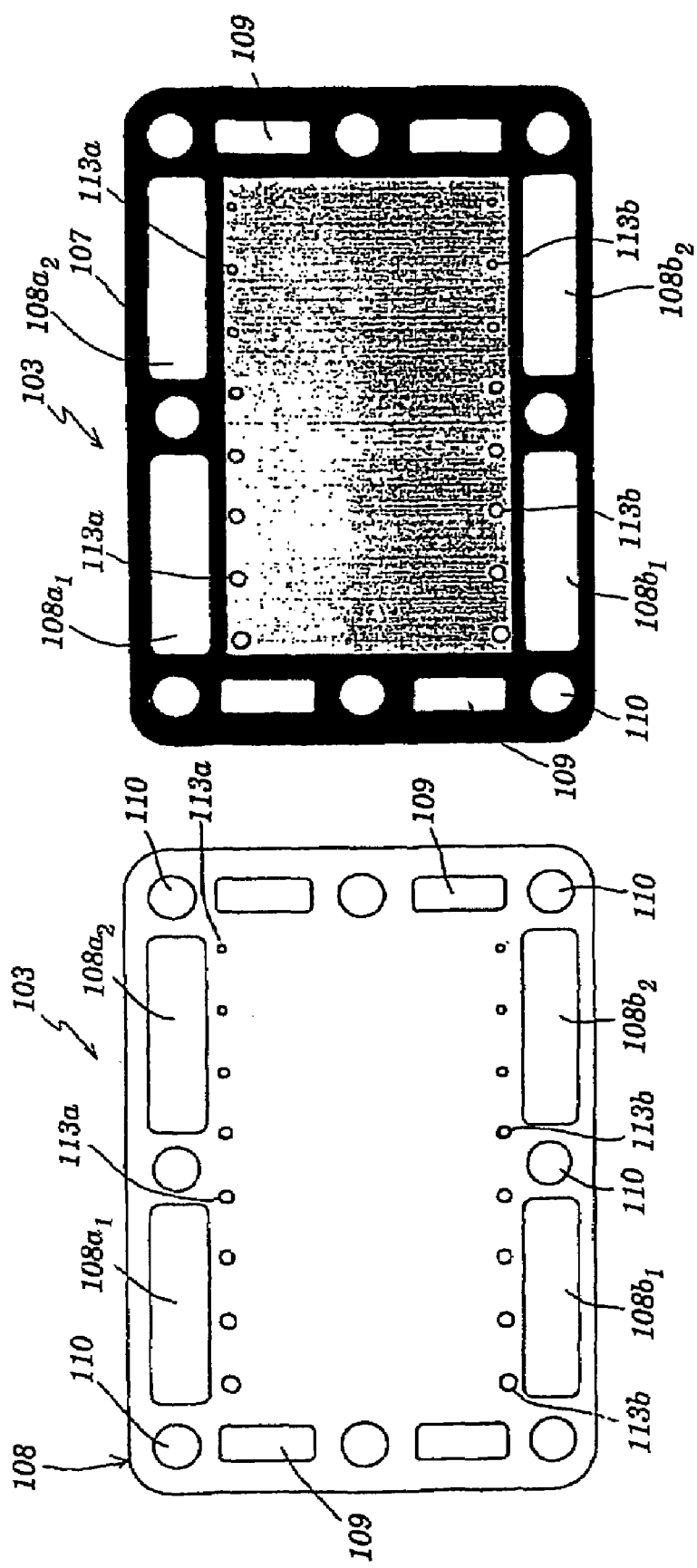

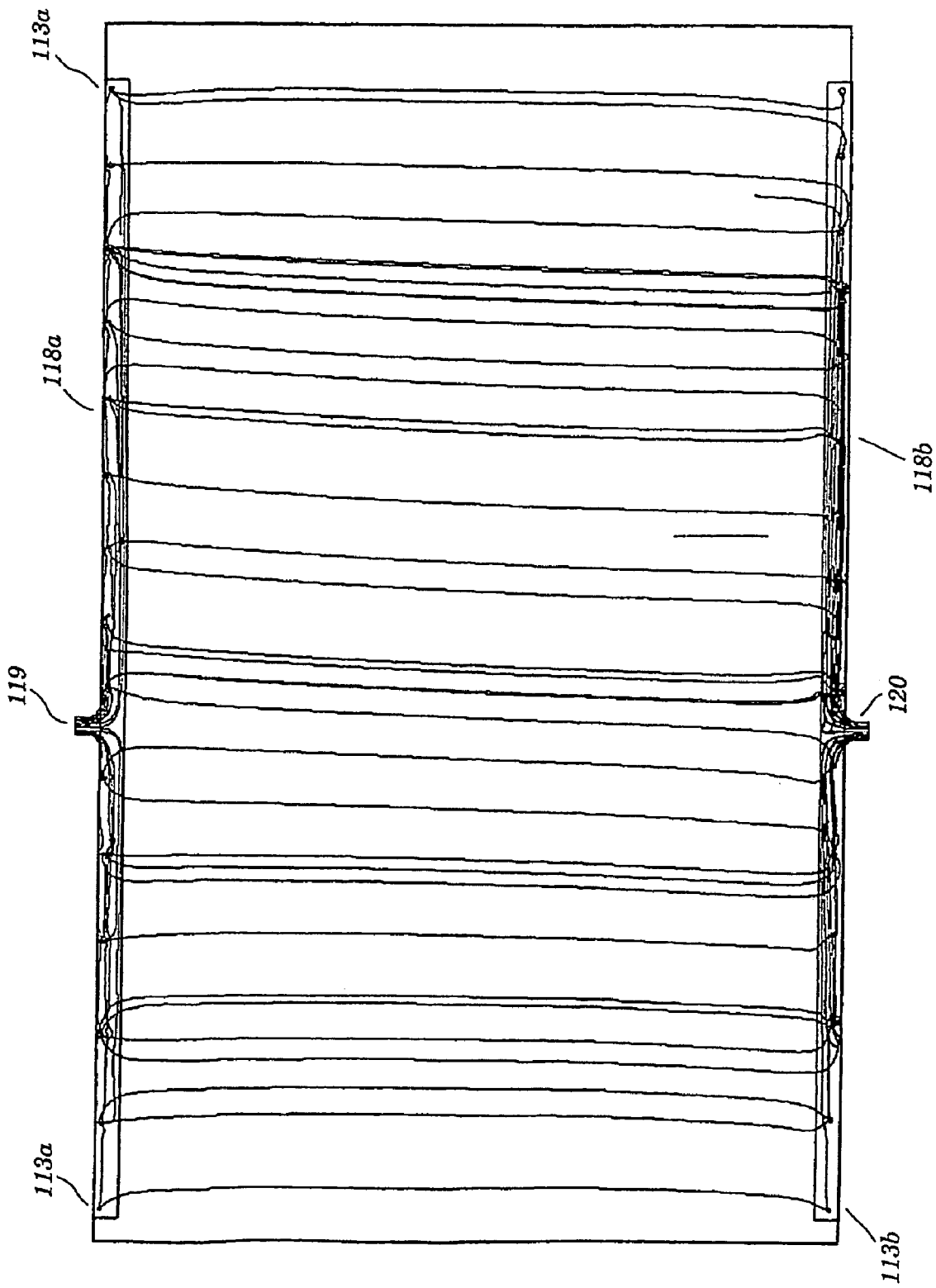

MEMBRANE ELECTROCHEMICAL GENERATOR

This application is a 371 of PCT/EP03/04207 filed Apr. 23, 2003.

DESCRIPTION OF THE INVENTION

The present invention relates to a membrane electrochemical generator having reduced size.

Processes of energy conversion of chemical energy to electric energy based on membrane electrochemical generators are known in the art.

An example of membrane electrochemical generator is shown schematically in FIG. 1. The electrochemical generator 1 is formed by a multiplicity of reaction cells 2 mutually connected in series and assembled according to a filter-press configuration.

Each reaction cell 2 converts the free energy of reaction of a first gaseous reactant (fuel) with a second gaseous reactant (oxidant) without degrading it completely to the state of thermal energy, thereby without being subject to the limitations of Carnot's cycle. The fuel is supplied to the anodic chamber of the reaction cell 2 and consists for instance of a mixture containing hydrogen or light alcohols, such as methanol or ethanol, while the oxidant is supplied to the cathodic chamber of the same cell and consists for instance of air or oxygen. The fuel is oxidised in the anodic chamber simultaneously releasing $H^+$ ions, while the oxidant is reduced in the cathodic chamber, consuming $H^+$ ions. An ion-exchange membrane separating the anodic chamber and the cathodic chamber allows the continuous flux of $H^+$ ions from the anodic chamber to the cathodic chamber while hindering the passage of electrons. In this way, the difference of electric potential established at the poles of the reaction cell 2 is maximised.

More in detail, each reaction cell 2 is delimited by a pair of conductive bipolar plates 3, having planar faces, among which are comprised, proceeding outwards, the ion-exchange membrane 4; a pair of porous electrodes 5; a pair of catalytic layers 6 deposited at the interface between the membrane 4 and each of the porous electrodes 5; a pair of current collectors/distributors 7 electrically connecting the conductive bipolar plates 3 to the porous electrodes 5 while distributing the gaseous reactants; a pair of sealing gaskets 8 directed to seal the periphery of the reaction cell 2 in order to avoid the escape of gaseous reactants.

In the conductive bipolar plates 3 and in the sealing gaskets 8 of each reaction cell 2, first openings are present, not shown in FIG. 1, which are connected to the anodic chamber and the cathodic chamber of the cell itself through distribution channels, also not shown in FIG. 1. The distribution channels are obtained in the thickness of the sealing gaskets 8 and have a comb-like structure. They distribute and collect in a uniform fashion within each reaction cell 2 the gaseous reactants and the reaction products, the latter being mixed with the optional residual reactants.

The sealing gaskets 8 are also provided with second openings for the passage of a cooling fluid (typically deionised water).

The coupling between the above mentioned openings determines the formation of two upper longitudinal ducts 9, of two lower longitudinal ducts 10 and of lateral ducts, not shown in FIG. 1. The two upper longitudinal ducts 9, only one of which is shown in FIG. 1, define feeding manifolds for the gaseous reactants (fuel and oxidant), the two lower longitudinal ducts 10, only one of which is shown in FIG. 1, define discharge manifolds for the reaction products (water) mixed with the optional residual reactants (gaseous inerts and unconverted fraction of reactants) whilst the lateral ducts define feeding manifolds for the cooling fluid. As an alternative, the lower longitudinal ducts 10 may be used as feeding manifolds, and the upper longitudinal ducts 9 as discharge manifolds. It is also possible to feed one of the two gaseous reactants through one of the upper longitudinal ducts 9, using the corresponding lower longitudinal duct 10 for the discharge, while feeding the other gaseous reactant through the other lower longitudinal duct 10 using the corresponding upper longitudinal duct 9 for the discharge.

Externally to the assembly of reaction cells 2, two conductive terminal plates 11 are present, delimiting the electrochemical generator 1. One of the two conductive terminal plates 11 is provided with nozzles, not shown in FIG. 1, for the hydraulic connection of the upper and lower longitudinal ducts 9 and 10 and of the lateral ducts. Moreover, both of the conductive terminal plates 11 are provided with suitable holes (also not shown in FIG. 1) for housing tie-rods, by means of which the tightening of the electrochemical generator 1 is achieved.

The known electrochemical generator 1 may also comprise a multiplicity of cooling cells (not shown in FIG. 1), interposed between the reaction cells 2 in a 1:1, 1:2 or 1:3 ratio with respect to the same reaction cells. The cooling cells are entirely similar to the reaction cells 2 except that they do not comprise the electrochemical package composed by the ion-exchange membrane 4, the porous electrodes 5 and the catalytic layers 6 on the inside thereof.

The known electrochemical generator 1, although advantageous under several aspects, presents however the drawback of being not achievable with an overall size below a limit value determined by the thickness of the sealing gaskets 8. In fact, the thickness of the sealing gasket 8 must allow the obtainment of the distributing channels.

Membrane electrochemical generators are also known wherein the gaseous reactants are distributed through channels directly obtained on the faces of the conductive bipolar plates. In this case, the distributing channels connect the upper longitudinal ducts to the lower longitudinal ducts acting as paths for the passage of gases and covering the majority of the electrode surface. Also these electrochemical generators present an excessive thickness of the reaction cell due to the technical difficulty of realising the distributing channels using thin plates.

The object of the present invention is to provide a membrane electrochemical generator, free from the described drawbacks.

According to the present invention, a membrane electrochemical generator is provided as defined in claim 1.

For a better understanding of the invention, an embodiment thereof is hereby described, as a mere non limiting example and making reference to the attached drawings, wherein:

FIGS. 3a and 3b show front-views of components of the electrochemical generator of FIG. 2;

FIG. 5 shows the path of the gaseous reactants within the electrochemical generator of FIG. 2.

Figure 1:
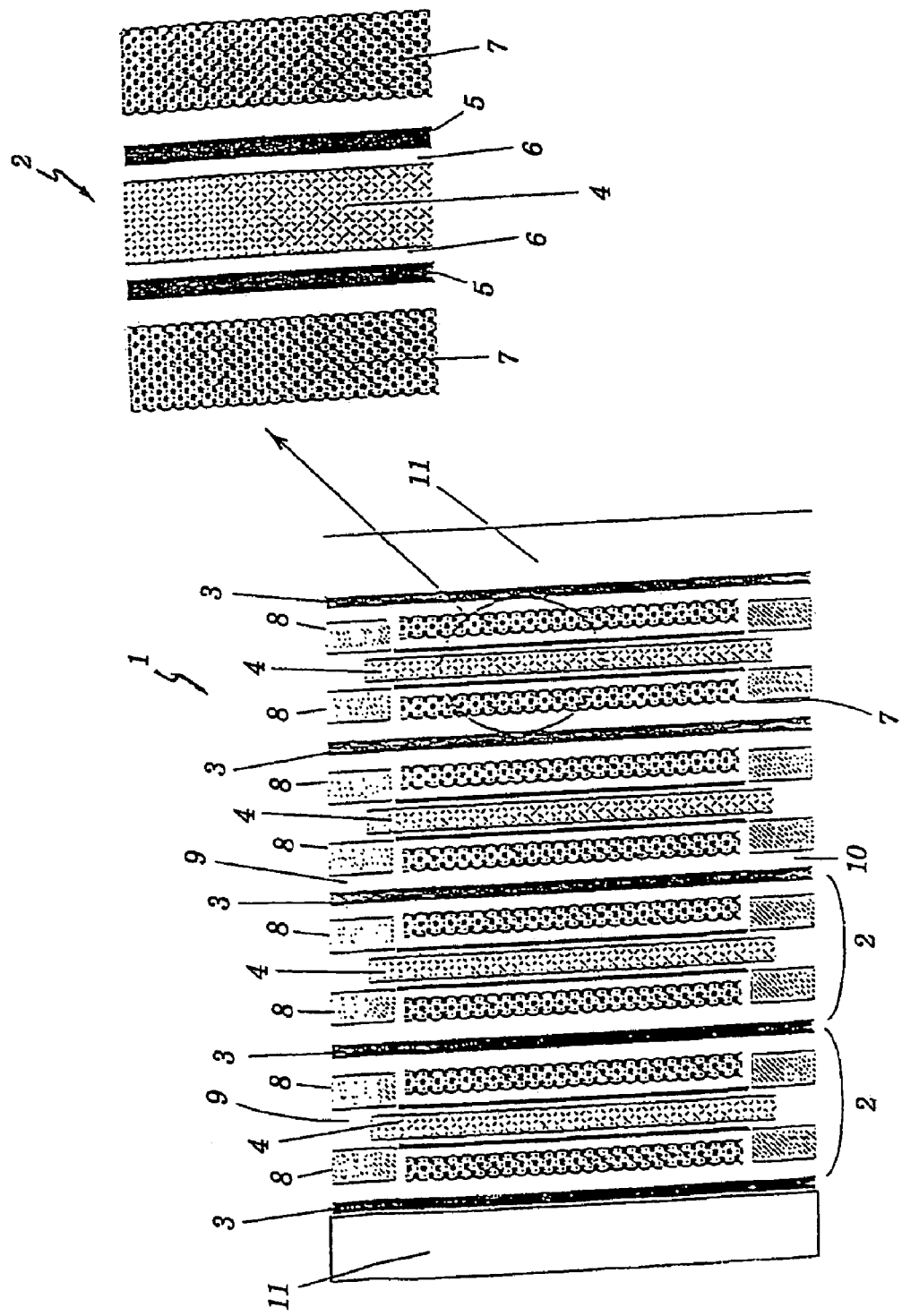
FIG. 1 shows an exploded side-view of a membrane electrochemical generator realised according to the prior art.
Figure 2:
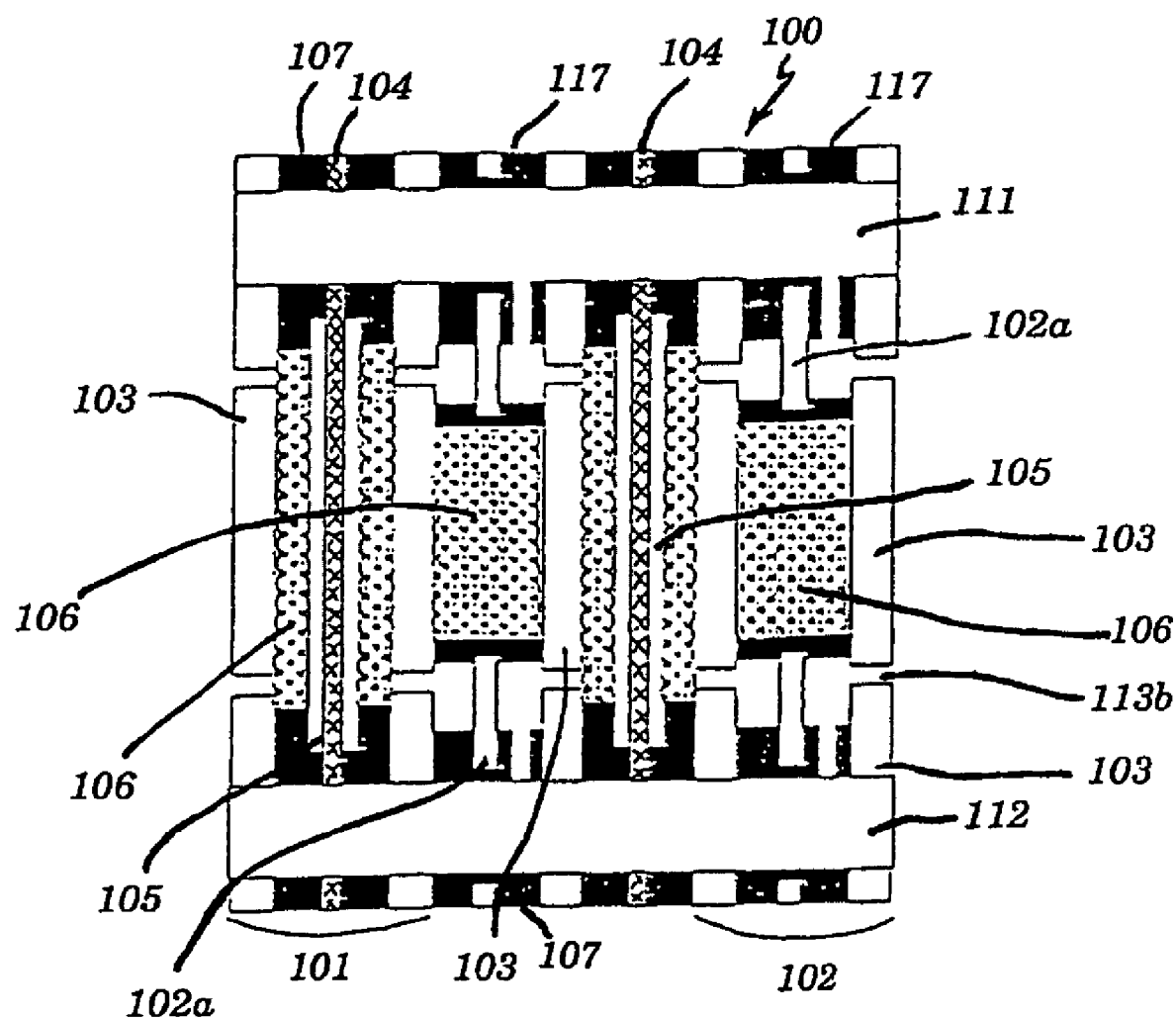
FIG. 2 shows a cross-section of a portion of a membrane electrochemical generator realised according to the invention.

FIG. 2 shows a cross-section of a portion of a membrane electrochemical generator 100 formed by a multiplicity of reaction cells 101 and of cooling cells 102 mutually connected in series and assembled according to a filter-press type configuration, each cooling cell 102 being interposed between a pair of reaction cells 101.

More in detail, each reaction cell 101 is delimited by a pair of conductive bipolar plates 103 with planar faces between which are comprised, proceeding outwards, an ion-exchange membrane 104; a pair of porous electrodes 105; a pair of current collectors/distributors 106 electrically connecting the conductive bipolar plates 103 to the porous electrodes 105; a pair of sealing gaskets 107 directed to seal the periphery of the reaction cell 101 with the purpose of avoiding the escape of the gaseous reactants.

The conductive bipolar sheets 103, shown in FIGS. 3a, 3b, have a substantially rectangular shape and a typical thickness of 0.1-0.4 mm. They present a peripheral portion 108 provided with first and second upper openings $108a_1$, $108a_2$, first and second lower openings $108b_1$, $108b_2$ and side openings 109. The peripheral portion 108 is also provided with a multiplicity of openings 110 for housing the tie-rods by means of which the tightening of the electrochemical generator 100 is achieved.

As shown in FIG. 3b, the sealing gaskets 107 are laid on one face only of each conductive bipolar plate 103 by moulding (injection or compression), mechanical anchoring or sticking. They provide the seat for the current collectors/distributors 106 besides delimiting the reaction cell 101 active area.

In particular, the sealing gaskets 107 are made of a soft material, for example silicone, elastomer, etc., and present a final thickness that may vary between some tenth of a millimeter to a few millimeters.

Each conductive bipolar plate 103 is also provided with a multiplicity of upper calibrated holes 113a and a multiplicity of lower calibrated holes 113b with a diameter comprised between 0.1 mm and 5 mm. Through the multiplicity of upper calibrated holes 113a, the gaseous reactants proceeding from the adjacent cooling cell 102 flow, while through the multiplicity of lower calibrated holes 113b the reaction products and the residual reactants leave the reaction cell 101, as will be explained below in more detail. The upper calibrated holes 113a are mutually aligned with the purpose of ensuring a homogeneous distribution of the gaseous reactants and are placed below the first and second upper openings $108a_1$, $108a_2$. The lower calibrated holes 113b are in their turn mutually aligned and are placed above the first and second lower openings $108b_1$, $108b_2$. Both the upper 113a and the lower calibrated holes 113b are positioned at a distance of about 1 mm from the sealing gasket 107, in order to better exploit the reaction cell 101 active area.

During the assemblage of the electrochemical generator 100, the coupling between the first and second upper openings $108a_1$, $108a_2$ of all the conductive bipolar plates 103 determines the formation of two upper longitudinal ducts 111 while the coupling between the first and second lower openings $108b_1$, $108b_2$ of all the conductive bipolar plates 103 determines the formation of two lower longitudinal ducts 112. The two upper longitudinal ducts 111, only one of which is shown in FIG. 2, define the feeding manifolds of the gaseous reactants (fuel and oxidant) while the two lower longitudinal ducts 112, only one of which is shown in FIG. 2, define the discharge manifolds of the reaction products mixed with the optional residual reactants. As an alternative, the lower longitudinal ducts 112 may be used as the feeding manifolds, and the upper longitudinal ducts 111 as the discharge manifolds. It is also possible to feed one of the two gaseous reactants through one of the two upper longitudinal ducts 111, using the corresponding lower longitudinal duct 112 for discharging, while feeding the other gaseous reactant through the other lower longitudinal duct 112 using the corresponding upper longitudinal duct 111 for discharging.

Furthermore, the coupling between the side openings 109 of all the conductive bipolar sheets 103 determines the formation of lateral ducts not shown in FIG. 2 for the passage of a cooling fluid.

Figures 4A, 4B:
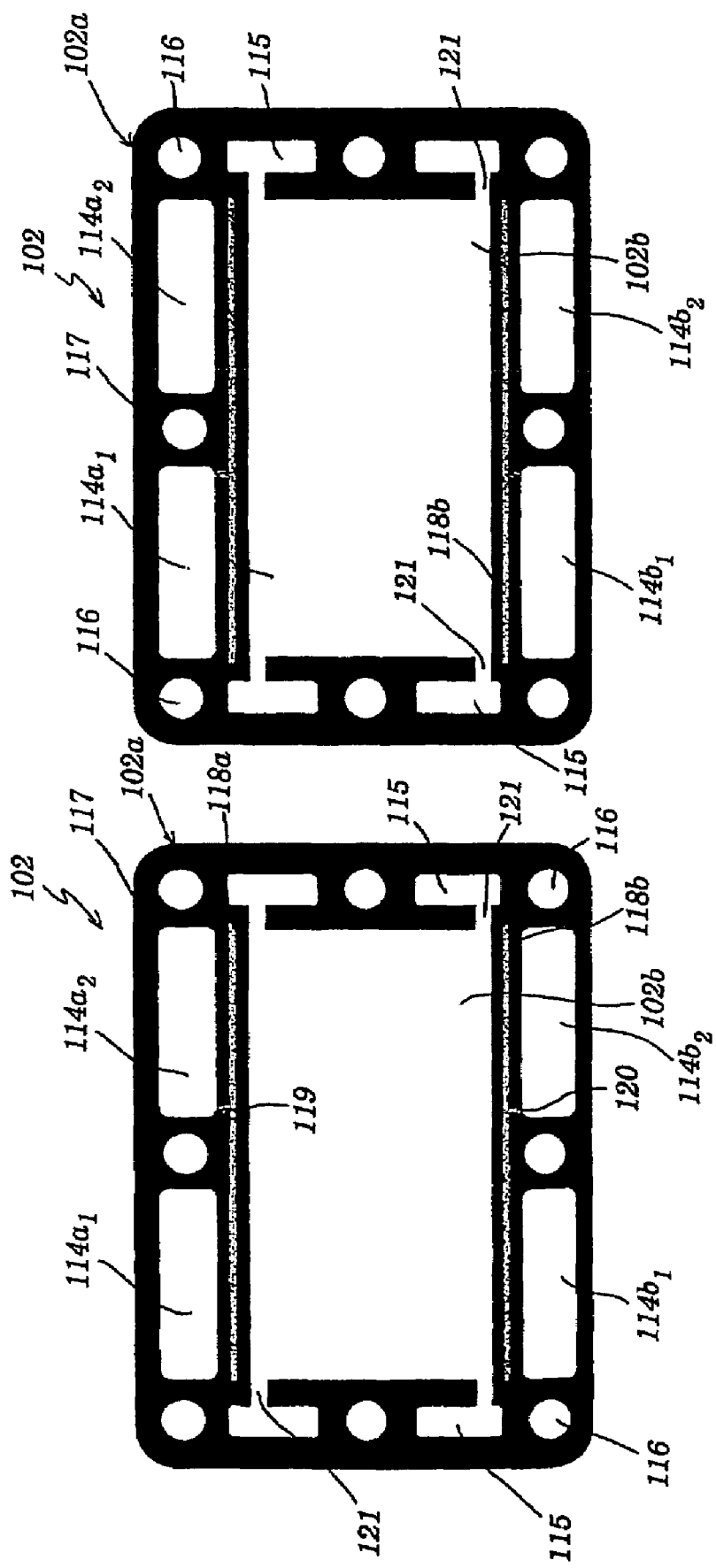
FIGS. 4a, 4b show front-views of further components of the electrochemical generator of FIG. 2.

Making now reference to FIGS. 4a, 4b, each cooling cell 102 has a substantially rectangular shape and dimensions equivalent to those of the reaction cell 101. Each cooling cell 102 comprises a rigid peripheral portion 102a, made of plastics or metal, acting as the separating surface for the two gaseous reactants, and a hollow central portion 102b to provide the seat of the current collector/distributor 106 through which the heat exchange takes place. The rigid peripheral portion 102a is provided with first and second upper openings $114a_1$, $114a_2$, first and second lower openings $114b_1$, $114b_2$ and side openings 115. In the filter-press configuration, the first and second upper openings $114a_1$, $114a_2$ of the cooling cells 102 form, in conjunction with the first and second upper openings $108a_1$, $108a_2$ of the reaction cells 101 the two upper longitudinal ducts 111 while the first and second lower openings $114b_1$, $114b_2$ of the cooling cells 102 form, in conjunction with the first and second lower openings $108b_1$, $108b_2$ of the reaction cells 101, the two lower longitudinal ducts 112. The side openings 115 of the cooling cells 102 form in their turn, in conjunction with the side openings 109 of the reaction cells 101, the feeding manifolds of the cooling fluid. The rigid peripheral portion 102a is also provided with a multiplicity of holes 116 for housing the tie-rods by means of which the tightening of the electrochemical generator 100 is achieved.

Moreover, each cooling cell 102 comprises gaskets 117 which are laid oil both faces of the rigid peripheral portion 102a so as to define on each face of such peripheral portion a zone of collection of the gaseous reactants 118a positioned below the first and second upper openings $114a_1$, $114a_2$; a zone of collection of the reaction products and of the residual reactants 118b positioned above the first and second lower openings $114b_1$, $114b_2$; a feeding channel 119 to connect one of the two upper openings $114a_1$, $114a_2$ to the zone of collection of the gaseous reactants 118a; a discharge channel 120 to connect the zone of collection of the reaction products and of the residual reactants 118b to one of the lower openings $114b_1$, $114b_2$; side channels 121 for the inlet and the outlet of the cooling fluid placed in correspondence of the zone of collection of the gaseous reactants 118a and of the zone of collection of the reaction products and of the residual reactants 118b. In the filter-press configuration, the zone of collection of the gaseous reactants 118a is overlaid to the upper calibrated holes 113a while the zone of collection of the reaction products and of the residual reactants is overlaid to the lower calibrated holes 113b. The gaskets 117 seal the zone of collection of the gaseous reactants 118a and the zone of collection of the reaction products and of the residual reactants 118b so as to hinder the passage of the gaseous reactants, of the reaction products and of the residual reactants within the cooling cell 102.

Furthermore, the gaskets 117 are made of a soft material (silicone, elastomer, etc.) compatible with the tightening/assemblage loads imposed by the sealing gaskets 107 of the reaction cell 101, and are laid on the rigid peripheral portion 102a through moulding (injection or compression), mechanical anchoring or sticking.

The electrochemical generator 100 operates as follows. The gaseous reactants (fuel and oxidant) which are supplied to the electrochemical generator 100 through the upper longitudinal ducts 111 flow to the zone of collection of the gaseous reactants 118a through the feeding channels 119. The gaseous reactants, being prevented from flowing within the cooling cells 102, pass herefrom through the multiplicity of upper calibrated holes 113a placed on the conductive bipolar plates 103 of the adjacent reaction cells 101 (FIG. 5). In this way the gaseous reactants reach the reaction cell 101 active area where the proper reaction takes place.

The reaction products and the residual reactants produced in the reaction cells 101 pass in their turn through the multiplicity of lower calibrated holes 113b positioned on the conductive bipolar plates 103 of the same reaction cells (FIG. 5), reaching the zones of collection of the discharge products 118b of the adjacent cooling cells 102. Herefrom, they leave the electrochemical generator 100 through the discharge channels 120.

The cooling fluid supplied through the side ducts enters and leaves the cooling cells 102 through the side channels 121 while the distribution thereof inside such cells is deputed to the current collectors/distributors 106.

Thus, according to the present invention, the cooling cells 102 perform the dual function of chambers for the passage of the cooling fluid and of chambers for the passage of the gaseous reactants, of the reaction products and of the residual reactants.

The advantages that can be achieved with the membrane electrochemical generator 100 are the following.

Firstly, the membrane electrochemical generator 100 presents a remarkably reduced overall size with respect to the known electrochemical generators. In fact, the replacement of the distributing channels obtained within the thickness of the sealing gaskets with the upper and lower calibrated holes 113a, 113b realised on the conductive bipolar plates 103 allows employing components of minimal thickness, particularly as regards the gaskets.

Moreover, the replacement of the distributing channels with the calibrated holes allows an improved sealing of gaskets 107 and of gaskets 117, which now result completely flat.

It is finally apparent that modifications and changes may be made to the disclosed electrochemical generator 100, without departing from the extent of the present invention.

The invention claimed is:

1. A membrane electrochemical generator fed with gaseous reactants and comprising a multiplicity of reaction cells (101) mutually connected in series and assembled according to a filter-press type configuration, each reaction cell (101) being delimited by a pair of conductive bipolar plates (103) with flat faces between which are comprised, proceeding outwards, an ion-exchange membrane (104); a pair of porous electrodes (105); a pair of current collectors/distributors (106) electrically connecting said conductive bipolar plates (103) to said porous electrodes (105), said bipolar plates (103) having upper openings ($108a_1$, $108a_2$) and lower openings ($108b_1$, $108b_2$) obtained on a peripheral portion (108) thereof, said upper and lower openings ($108a_1$, $108a_2$; $108b_1$, $108b_2$) determining the formation of upper and lower longitudinal ducts (111; 112) which define feeding manifolds for gaseous reactants and discharge manifolds for reaction products and optional residual reactants, respectively, wherein the said conductive bipolar plates (103) comprise a multiplicity of mutually aligned upper calibrated holes (113a) arranged below said upper openings ($108a_1$, $108a_2$) and a multiplicity of mutually aligned lower calibrated holes (113b) arranged above said lower openings ($108b_1$, $108b_2$) for the passage of said gaseous reactants from an adjacent cell and for the discharge of the reaction products and of the optional residual reactants, respectively.

2. A generator of claim 1, wherein said upper calibrated holes (113a) and said lower calibrated holes (113b) are placed at a distance of about 1 mm from a sealing gasket (107) covering only one face of said peripheral portion (108), said sealing gasket (107) providing a seat for the current collector (106) and delimiting the active area of the reaction cell (101).

3. A generator of claim 2, wherein said sealing gasket (107) is laid on said peripheral portion (108) by injection molding or compression molding or mechanical anchoring or sticking.

4. A generator of claim 2, wherein said sealing gasket is made of a soft material comprising silicone or elastomers and said sealing gasket (107) presents a thickness that may vary between some tenths of a millimeter to a few millimeters.

5. A generator of claim 1 wherein said upper calibrated holes (113a) and said lower calibrated holes (113b) have a diameter between 0.1 mm and 5 mm.

6. A generator of claim 1 further comprising a plurality of cooling cells (102), each cooling cell (102) being interposed between a pair of reaction cells (101).

7. A generator of claim 6, wherein each cooling cell (102) comprises a rigid peripheral portion (102a) and a hollow central portion (102b), said rigid peripheral portion (102a) acting as a separating surface for said gaseous reactants and said hollow central portion (102b) providing the seat of a corresponding current collector/distributor (106).

8. A generator of claim 7, wherein said rigid peripheral portion (102a) is provided with feeding openings ($114a_1$, $114a_2$) and discharge openings ($114b_1$, $114b_2$), said feeding openings ($114a_1$, $114a_2$) of said rigid peripheral portion (102a) of said cooling cells (102) forming feeding longitudinal ducts (111) in conjunction with said feeding openings ($108a_1$, $108a_2$) of said peripheral portion (108) of said conductive bipolar plates (103) and said discharge openings ($114b_1$), $114b_2$) of said rigid peripheral portion (102a) of said cooling cells (102) forming longitudinal discharge ducts (112) in conjunction with said discharge openings ($108b_1$, $108b_2$) of said peripheral portion (108) of said conductive bipolar plates (103).

9. A generator of claim 8 wherein said rigid peripheral portion (102a) is covered on each face by a gasket (117), said gasket (117) defining on each face of said rigid peripheral portion (102a) a zone of collection of the gaseous reactants (118a) placed in correspondence of said feeding openings ($114a_1$, $114a_2$) of said rigid peripheral portion (102a), a zone of collection of the reaction products and of the residual reactants (118b) placed in correspondence of said discharge openings ($114b_1$), $114b_2$) of said rigid peripheral portion (102a), a feeding channel (119) to connect one of said feeding openings ($114a_1$, $114a_2$) to said zone of collection of the gaseous reactants (118a), a discharge channel (120) to connect said zone of collection of the reaction products and of the residual reactants (118b) to one of said discharge openings ($114b_1$, $114b_2$).

10. A generator of claim 9, wherein said gaskets (117) seal said zone of collection of the gaseous reactants (118a) and said zone of collection of the reaction products and of the residual reactants (118b) so as to hinder the passage of said gaseous reactants and of said reaction products and optional residual reactants within said cooling cell (102).

11. A generator of claim 9 wherein, in a filter-press configuration, said zone of collection of the gaseous reactants (118a) is overlaid to said first calibrated holes (113a) and said zone of collection of the reaction products and of the residual reactants (118*b*) is overlaid to said second calibrated holes (113*b*).

12. A generator of claim 9 wherein said gasket (117) is laid on said rigid peripheral portion (102*a*) by means of injection molding or compression molding or mechanical anchoring or sticking and that said gasket (117) is made of a soft material comprising silicones, elastomers, etc.

13. A generator of claim 9, wherein said rigid peripheral portion (102*a*) of said cooling cells (102) is provided with side openings (115) for the passage of a cooling fluid and of inlet and outlet side channels (121) of said cooling fluid, said side channels (121) being placed respectively in correspondence of said zone of collection of the gaseous reactants (118*a*) and of said zone of collection of the reaction products and of the residual reactants (118*b*).

14. A generator of claim 7 wherein said rigid peripheral portion (102*a*) is made of plastics or metal.

* * * * *